July 10, 1962 H. LANSKI 3,043,191
METHOD OF APPLYING SPECTACLES PADS
Filed May 15, 1959
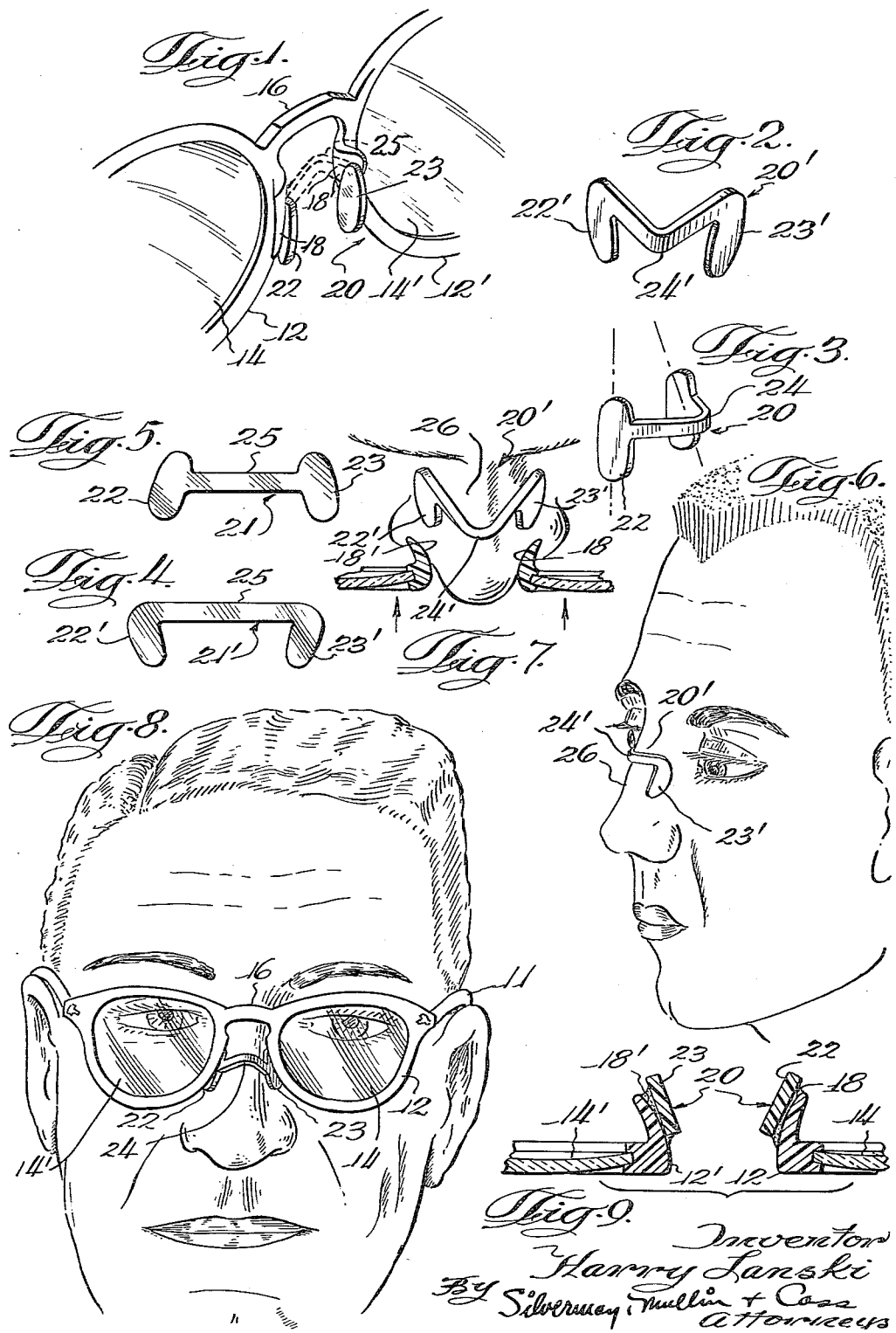

United States Patent Office 3,043,191
Patented July 10, 1962

3,043,191
METHOD OF APPLYING SPECTACLES PADS
Harry Lanski, 6807 Sheridan Road, Chicago, Ill.
Filed May 15, 1959, Ser. No. 813,449
3 Claims. (Cl. 88—48)

This invention relates generally to ophthalmic devices and more particularly to a novel method of fitting spectacle frames to a spectacle pad.

Although the prior art of spectacle frames and methods relating to the proper fitting thereof to individual users is a highly developed one, considerable difficulties are still encountered. When spectacles are prescribed for the correction of sight deficiencies, much of the corrective powers of said lenses are dependent upon the location of said lenses at a standarized distance and at a particular angle relative the user's eyes. Even a slight change in the said position results in at least a partial failure in correction, thereby causing continued eyestrain, tiredness, headaches, and other symptoms of sight deficiencies. In certain eye conditions, a change in the proper position of the lenses prevents any correction, thus, for example, when astigmatism or cataract-caused deficiencies are involved, even a small displacement renders the lenses ineffective, and the eye condition becomes worse instead of being partially relieved to the full extent possible with corrective lenses.

For their support in place on the wearer, corrective lenses are dependent upon spectacle frames in which they are permanently disposed. These frames may be made of metal or, as is the more prevalent usage in recent times, from plastic material of the thermoplastic type. They comprise for the most part a framing portion in which the lenses are set, a temple portion which may or may not extend around the ears but which usually grips the temples of the wearer, and a connecting bridge portion adapted to fit across the bridge of the wearer's nose. Most spectacle frames will also have pad members either integral with or attached to the portion of the frames near the connecting bridge, said pads adapted to engage each of the upper sides of the user's nose so as to partially support the weight of the spectacle. The invention is concerned with these pads and the overcoming of considerable disadvantages of those presently found in the prior art.

In order to properly fit a pair of spectacles to an individual user, the optometrist will first measure, by means of special optical instruments, and determine the exact configuration of the lenses needed to correct the sight defect. The calculations made at this time are dependent upon a standardized distance and angle at which such lenses are to be positioned upon the wearer. The lenses are then ground to the dimensions or prescription determined, and the wearer chooses the style, color and type of spectacle frame desired. The wearer is then measured for the fitting of these spectacle frames. This measurement involves, among other data, measurement of the distance across each eye, the distance across both eyes, the depth of the nose bridge, the angle at which said bridge appears relative to the eye, the width of said bridge and other such similar facial configuration data needed to correctly fit the spectacle frame and lenses to the particular individual user. The next step involves the setting of the ground lenses permanently in the frame chosen by the user, and then, the optometrist, generally by a trial and error method, properly positions the spectacles directly upon the wearer. In the case of metal frames, the optometrist must manipulate the frames, either at the temple pieces, or the pad portions, by the use of highly specialized tools, as for example, various optical pliers, files and the like. The fit must be snug but not so snug as to be irritating while the spectacles are being worn. Comfort is essential to the wearer of spectacles, therefore such careful consideration must be given to providing comfort by means of proper fitting of said spectacles.

In the instances involving the modern plastic frames, the manipulating is also one requiring the same trial and error fitting, and additionally requires the softening by heating of the plastic, then the bending and gauging thereof upon the wearer. The prior art methods all involve multple handling of the lens containing spectacle frames, considerable twisting of said frames, and like difficulties. All these difficulties could probably be eliminated without the use of any but mechanical skill by the maintenance of spectacle frame stock such as would cover each measurement and every type of facial structure found, and in addition, the carrying of a stock of all sizes in every possible ornamental design.

Of course, one immediately recognizes that there are almost as many different facial structures as there are people and that it would be an impossibility for the purveyor of spectacles to maintain a stock as just described. This is not merely due to the substantial economic burden of such a stock, but the simple physical impossibility of having enough floor space or shelf space to place so many different sets of spectacle frames. Therefore, the optometrist maintains only spectacle frames of a definite and particular standardized size, said sizes being determined by the manufacturer to be a median or average size and not necessarily perfectly fitting any individual, said frames always requiring specialized fitting operations as described above, together with such inherent disadvantages also as enumerated above.

The above described difficulties and disadvantages encountered in fitting spectacles are considerable, but the disadvantages of the prior art structures described only begin with the fitting of the spectacles. Once the spectacles have been fitted in a particular prescribed position, they must remain in said position for the lenses to be employed to their proper efficiency. Therefore, when said spectacles are removed from their operative position by the user and henceforth returned thereto, the position must be the same as that before removal. This often repeated removal and return must not change the position at which the spectacles are set upon the user or else the sharpness and clarity of vision, the eyesight correction, the freedom from eyestrain, and all other important reasons for wearing of spectacles are frustrated.

Not only do presently used spectacles fail to return to their proper position after wear, but the temple pieces become loose, throwing considerable stress upon the connecting bridge and upon the nose pads causing the entire weight of the spectacles to be borne by said nose pads and bridge portion. Therefore considerable slippage occurs during the wearing of said spectacles, causing the spectacles to fall down along the length of the wearer's nose. If slippage was not enough, considerable distress occurs to the wearer because of chafing and irritation caused by the pads digging into the sides of the nose.

The problem of supporting the weight of the spectacles becomes one of considerable import when corrective spectacles for astigmatism and/or cataract-caused conditions are concerned. These conditions are complex and require generally heavier and relatively thick lenses; these lenses requiring heavy frames to support them. Nevertheless, the main support for these types still remains to the temple pieces and nose pads of the frames.

Too often the presently required repeated manipulation during fitting, especially when heavy frames are involved, results in fracture of either the frame or the lenses due to the pressure necessary to conform the standardized spectacle to the facial formation of the individual user.

As can be observed above, the present methods are expensive, time consuming, not satisfactory for maintaining the fit during the useful life of the spectacles, and that the pads presently employed not only fail to cure the above disadvantages during the fitting, but incur some of their own during the useful life of said device, such as loosening, becoming a source of chafing and irritation to the wearer, and an overall failure to properly accomplish their functional purpose.

It is the principal object of the invention to provide a method for fitting of the spectacles by which all difficulties and disadvantages enumerated hereinabove and others substantially will be eliminated.

A further object of this invention is to provide a method of adapting a spectacle nose pad to easily fit any normal human nose structure regardless of width or depth thereby reducing the necessity of carrying a large stock of every conceivable different sized spectacle frame by the optometrist or other purveyor of spectacles concerned with the fitting of said spectacles.

Another object of this invention is to provide a method of adapting nose pads to any known type of spectacle frame so as to properly and permanently maintain the exact corrective positioning with which it has been originally disposed throughout the useful life of said spectacles.

A further object is to provide a method for fitting a spectacle pad upon the nose structure of the user prior to the attachment of the remainder of the spectacle frame so that only the small spectacle pad requires any manipulation directed upon the wearer instead of the present manipulation required of the entire spectacle frame and lenses disposed therein.

Another object is to provide a method whereby the novel spectacle pad may be used during the fitting and positioning of a pair of spectacles, so that said spectacles will be properly fitted at the correct angle and distance relative to the eye without undue manipulation of the entire spectacle frame.

It is a further object of this invention to provide a method by which any spectacle frame may be fitted to any facial structure regardless of the size, shape or width of the same.

With the foregoing and other objects in view which will appear as the description proceeds, the invention consists of certain novel features of construction, arrangement and a combination of parts hereinafter fully described, illustrated in the accompanying drawing, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawing a preferred embodiment thereof, from an inspection of which, when considered in connection with the following description, this invention, its mode of construction, assembly and operation, and many of its advantages should be readily understood and appreciated.

Referring to the drawing:

FIG. 1 is a fragmentary rear perspective view of a pair of spectacles showing the spectacle pads embodying the invention installed in operative position.

FIG. 2 is a perspective view of the spectacle pad embodying the invention prior to installation upon the nose of the wearer.

FIG. 3 is a perspective view of a second embodiment of the invention prior to installation upon the nose of the wearer.

FIG. 4 is a top plan developed view of a blank from which the spectacle pad illustrated in FIG. 2 is formed.

FIG. 5 is a top plan developed view of a blank from which the second embodiment illustrated in FIG. 3 is formed.

FIG. 6 is a perspective view of an individual showing the embodiment of the invention as fitted upon the nose thereof, same being one of the steps of the fitting of said spectacles utilizing the novel pad.

FIG. 7 is a top view of the novel pad as shown in FIG. 6 illustrating another step in the method of placing of the spectacle frames upon the said pad in proper position, said spectacle frames being shown by fragmentary view thereof.

FIG. 8 is a front perspective view of an individual showing a pair of spectacles properly fitted upon the novel pads illustrated in FIG. 3, a further step in the method of fitting the spectacles.

FIG. 9 is a diagrammatic sectional view of the fitted spectacles and novel nose pads illustrating details thereof.

The invention is generally concerned with method of forming a spectacle pad structure from a blank member, said forming being partially performed directly upon the prospective wearer of said spectacles during the process of properly fitting spectacles for correction of eyesight deficiencies. The invention shown in an optional operative position upon a pair of spectacles in FIG. 1 is generally designated by the reference character 20. The structural parts of the pair of spectacles illustrated in FIG. 1 are well known to the art, said invention not being limited to any particular spectacle frame structure. Spectacles generally comprise frame portions 12 and 12' in which specially prescribed and ground lenses 14 and 14' are permanently disposed, one for each eye. Connecting the two portions of the framing portions is a bridge 16 while along the inner side of each of the frames are nose pads 18 and 18' formed integral with said frame or cemented permanently thereto. The pads embodying the invention are intended to supplement those pads 18 and 18' and are disposed one on each of the pads 18 and 18', being shown in FIG. 1 in finished and operative position.

The spectacle pads are formed from blanks which may comprise a thermoplastic resinous material such as acrylics, methacrylates, polyvinyls and the like, and may be formed by molding in multi-cavity molds or by stamping them directly from a sheet of such thermoplastic materials.

The spectacle pads are formed from blanks such as illustrated in FIGS. 4 and 5. The blank illustrated in FIG. 5 comprises two oval pads, 22 and 23 connected across their minor axes by an elongate connecting portion 25. This central connecting portion 25 is of strip-like configuration having inner and outer parallel edges and is integral with said pads 22 and 23.

The oval pad 22 is positioned so that its major axis is diagonal relative to the connecting bar 25; the other pad 23 being placed opposite pad 22 but at an angle equal but in an opposite direction to the angle at which pad 22 is placed. Thus the spectacle pads which are formed from said blank have their major axes substantially parallel to the plane of the wearer's septum 26, and the connecting portion 25 is essentially on a level of the wearer's eyes when placed in position as illustrated in FIGS. 6 and 8.

The blank shown in FIG. 4 is adapted to form a second embodiment of the invention, this embodiment characterized by the connecting bridge 25' being located across the top of the pads 22' and 23', and said pads located in the blank so that their major axes are diagonal to the bridge 25', each at equal but opposite angles thereto. This embodiment is placed upon the nose of the wearer in the position indicated in FIG. 8, whereas the embodiment shown in FIG. 3 is positioned as illustrated in FIG. 6, the connecting bridge of the latter being placed higher upon the nose of the wearer than that of the connecting portion of the embodiment shown in FIG. 3.

To form the spectacle pad 20, blank 21 is first softened such as by exposure to steam, hot water, or other source of mild heat and while still warm, is bent at the center 24 of connecting bar 25 so that the distance from the pads is equidistant from the bend 24. The blank is bent as indicated, then placed upon the nose of the wearer, and still being relatively warm and pliable, is conformed to the configuration of the bridge of the wearer's nose as indicated in FIG. 6; the connecting bridge 25 placed so that the central bend is resting upon the top of the nose while the pads rest rearward upon each side thereof. Only the spectacle pad embodying the invention requires forming upon the wearer and while still soft. The spectacle frames, carrying the corrective lenses are then brought up to the level of the fitted pads, and then brought to bear upon the said pads as illustrated in FIG. 8 so that the pad portion of the spectacles is opposite that of the connecting bridge. A small drop of adhesive is then placed upon the outer portion of each pad 22 and 23 and the spectacles brought in contact therewith, immediately being maneuvered into the proper corrective position.

The spectacle pads are thus in a position to brace said spectacles conforming closely with the natural configuration of the nose so that once attached in proper position, slippage or other involuntary change of position will not occur regardless of the number of instances said fitted spectacles are removed and replaced upon the wearer's nose. The loading weight is more easily borne by the combination of the spectacle frames' own pads and the invention, no matter what the exact size may be, the invention giving a greater loading surface and a perfect fit to the nasal configuration of the wearer.

After the spectacles have been properly fitted and attached to the spectacle pads, the connecting bridge 25 may either be worn therewith, or may be snipped off at the junction with the pads, separating pads 22 and 23 thus resulting in the structure shown in FIG. 1.

The invention contemplates the provision of blank members such as illustrated in FIGS. 4 and 5 but in a relatively thin material particularly characterized by its ability to be ductile without needing any special softening process. The heat of the manipulator's thumb and forefinger should be enough to permit formation into the proper wearing shape directly upon the wearer. Thus the process using these embodiments comprises the selection from a size group of the proper blank member according to the bridge distance needed, taking said blank between the thumb and forefinger of the manipulator's hand, placing the blank with its center adjacent the nose bridge, exerting a pressure with the thumb and forefinger upon the said blank so as to form same to the shape of the nose as desired. Once the spectacle pad has been so placed upon the nose, the spectacle frames are then placed in their proper position upon the said pads and joined thereto.

It is further contemplated that the blank members may be furnished to the optometrist in a series of partially formed structures, pre-bent in approximately a V-shape so that still less manipulation would be necessary.

The invention contemplates the provision of only a few lengths of connecting bridges in order to cover all types and measurements found in humans, and by means of which any type of spectacle may be fitted upon any individual requiring same. The method involved is very economical and speedy, requiring only the manipulation by, for example, the thumb and forefinger of one hand, to fit the invention upon the nose of the wearer. In addition, since the use of the invention permits the optometrist or other person involved in the fitting of spectacles to fit any individual with any set of frames, yet said purveyor need only carry the absolute minimum number of differently dimensioned spectacle pads.

It is believed that this invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variation within the purview of this invention as defined in the appended claims.

I claim:

1. A method of fitting spectacles in a prescribed position relative to the wearer's eyes whereby said position is maintained throughout the useful life of the said spectacles through the use of a blank member having a pair of interconnected pads, said method comprising the steps of placing said blank member upon the bridge of the wearer's nose in position to receive a pair of spectacle frames shaping said blank member to conformity with the individual nasal structure so that the pads rest one upon each side surface of the nose substantially parallel thereto, adhering said pads to said spectacle frame and removing the connection between said pads once the frame and the pads have been so joined.

2. A method of fitting and positioning spectacles in a prescribed position upon the wearer through the use of a pair of interconnected spectacle pad members of thermoplastic resinous material whereby said position is maintained without change during the useful life of the spectacles and said spectacle pad members being partially preformed, said method comprising the steps of softening the connection between said pad members, placing said pad members directly upon the nose of the wearer and conforming said structure to the actual nasal structure of said wearer whereby the pads rest upon the lateral surfaces of the nose substantially at the same opposed positions and parallel to the septum of the nose, positioning said spectacles at the proper level relative to the eyes of the wearer and in contact with said pad members, permanently securing said spectacles and pad members in said position, and then removing the interconnection between said pads.

3. A method of utilizing a pair of interconnected pad members in the fitting and maintaining of spectacles having a pair of nose pieces in their prescribed position upon the nose of a wearer, said method comprising the steps of softening the connective portion of said pad members until same is pliable, forming said members directly upon the bridge of the nose to the configuration thereof whereby the pad portions are positioned so that their surfaces rest upon the sides of the nose and the connecting portion rests upon the bridge of the nose substantially normal to the septum of said nose, applying an adhesive to the outer surfaces of one of said pair of nose pieces and pad members, bringing a pair of spectacles in bearing contact with said pad members to the correct desired position thereof relative the wearer's eyes and engaging said nose pieces to said pad members to cause said adhesive to join the same, and removing the connecting portion after the pads and spectacle frames have been secured.

References Cited in the file of this patent

UNITED STATES PATENTS

| | | |
|---|---|---|
| 2,501,259 | Brandt | Mar. 21, 1950 |
| 2,561,403 | Nelson | July 24, 1951 |
| 2,612,076 | Dietz | Sept. 30, 1952 |
| 2,654,290 | Hirschman | Oct. 6, 1953 |
| 2,949,638 | Butler | Aug. 23, 1960 |